United States Patent [19]

Shitama

[11] 4,360,906
[45] Nov. 23, 1982

[54] SELF-PROPELLED RECORD CLEANER

[75] Inventor: Katuaki Shitama, Nogata, Japan

[73] Assignee: Kyushu Hitachi Maxell, Ltd., Fukuoka, Japan

[21] Appl. No.: 246,589

[22] Filed: Mar. 23, 1981

[30] Foreign Application Priority Data

Mar. 22, 1980 [JP] Japan .......................... 55/37592[U]

[51] Int. Cl.³ .............................................. G11B 3/58
[52] U.S. Cl. ................................................. 369/72
[58] Field of Search .................................. 369/72, 73

[56] References Cited

U.S. PATENT DOCUMENTS 2,310,275  2/1943  Beebe ................................... 369/72
4,166,624  9/1979  Moxi et al. ........................... 369/72

FOREIGN PATENT DOCUMENTS

55-122206  9/1980  Japan .................................... 369/72
596634  10/1977  Switzerland ........................... 369/72
2066998  7/1981  United Kingdom .................. 369/72

Primary Examiner—Steven L. Stephan
Attorney, Agent, or Firm—Antonelli, Terry & Wands

[57] ABSTRACT

A self-propelled record cleaner comprising a cleaning brush, a drive wheel, and a battery-operated motor unit for driving both of the cleaning brush and the drive wheel in the opposite directions with respect to each other. The self-propelled record cleaner has a bearing hole adapted to receive a turntable spindle when the record cleaner is placed on a disc record mounted on the turntable. This self-propelled record cleaner can run on the disc record around the turntable spindle while brushing or cleaning dusts off from the disc record when the battery-operated motor unit is in operation. Some of components of the record cleaners are mounted in a casing at a position where they can be supported above a non-grooved area of the disc record.

5 Claims, 10 Drawing Figures

SELF-PROPELLED RECORD CLEANER

BACKGROUND OF THE INVENTION

The present invention generally relates to a record cleaner for cleaning a phonographic disc record and, more particularly, to a self-propelled record cleaner having a battery-operated motor drive which enables the cleaner to run on the disc record while removing dusts therefrom.

Various types of record cleaners are currently available in the market. Of them, the most sophisticated one is considered a battery-operated record cleaner such as disclosed in the Japanese Laid-open Utility Model Publication No. 54-125204 laid open to public inspection on Sept. 1, 1979.

According to the above mentioned laid-open publication, the battery-operated record cleaner comprises a generally rectangular-sectioned casing having upper and lower chambers defined therein, a cylindrical brush rotatably accommodated in the lower chamber with a portion of the outer periphery of the cylindrical brush exposed to the outside in a direction opposite to the upper chamber, a battery-operated motor housed within the upper chamber together with at least one battery, and an endless belt transmission system for transmitting the drive of the motor to the cylindrical brush. A pair of opposed side walls of the casing defining the lower chamber have a plurality of vent openings, such as parallel slots, through which air current induced by the rotation of the cylindrical brush is vented to the outside. Dusts carried by the air current so induced are adapted to be trapped by filter cloths attached to the perforated side walls, which perforated side walls are so hingedly supported as to be opened for the removal of the dusts accumulated within the lower chamber.

A portion of the casing above the hingedly supported and perforated side walls and adjacent the upper chamber serves a grip accessible to the hand of a user.

The record cleaner of the construction disclosed in the above mentioned laid-open publication is also provided with an optionally retractable guide piece adjacent one end of the cylindrical brush. This guide piece when set to a projected position enables the user to turn the record cleaner around the center opening of the disc record with the guide piece held in sliding contact with the outer peripheral edge of the disc record.

Although the use of the guide piece appears to be convenient for the user to turn the record cleaner around the center opening of the disc record to be cleaned or brushed, there still remains such a disadvantage that the user is forced to take care lest the guide piece should depart from its contact with the outer peripheral edge of the disc record. In addition, even though battery-operated, the conventional record cleaner is a hand-held type and, so long as it remains a hand-held type, the disc record being cleaned or brushed is likely to receive uneven pressure applied thereto through the brush. The application of the uneven pressure to the disc record is, as is well understood by those skilled in the art as well as audiomanias, likely to result in formation of indents on each delicate, grooved surface of the disc record. Naturally, the formation of the indents on the grooved surface of the disc record in turn results in distorted reproduction of information recorded on the disc record.

An idea of coupling a record cleaner to a turntable spindle while the disc record is mounted on the turntable of a record player in coaxial relation with the turntable spindle so that the record cleaner can turn around the turntable spindle brushing the grooved surface of the disc record is disclosed in the Japanese Utility Model Publication No. 51-27783 published July 14, 1976. According to this publication, the cleaner comprises an elongated casing of a length larger than the radius of the disc record available, a cylindrical brush partly accommodated within the casing and extending from one end of the casing to a substantially intermediate portion thereof, and a shaft member rotatably carried by the casing at a position adjacent the opposite end thereof and extending completely across the casing at right angles to the longitudinal axis of the cylindrical brush in a direction which, when the record cleaner is placed on the disc record with the shaft member aligned with the turntable spindle, is perpendicular to the plane of rotation of the disc record. The shaft member has one end inwardly recessed, or otherwise provided with a socket member, for receiving the turntable spindle and the other end pivotally connected with a foldable handle which, when the record cleaner is in use, protrudes diagonally upwardly from the casing at one side of the shaft member remote from the cylindrical brush.

For rotating the cylindrical brush about its own longitudinal axis, the shaft member is operatively coupled to the cylindrical brush through mating bevel gears fast with the shaft member and one end of the cylindrical shaft, respectively. Since the record cleaner disclosed in the latter mentioned publication is not a motor-driven type, the record cleaner when in use must be manually turned around the turntable spindle while the shaft member is fixed relative to the turntable spindle. Fixing the shaft member relative to the turntable spindle is accomplished by holding the handle with one hand while the other hand is used to turn the record cleaner around the turntable spindle. By so doing, the cylindrical brush is rotated to brush the grooved surface of the disc record while the record cleaner riding on the disc record turns around the turntable spindle.

This simplified record cleaner appears to be more convenient than the above described, battery-operated record cleaner in the sense that the record surface can uniformly be brushed or cleaned in a circumferential direction of the disc record. However, both hands of a user are required to manipulate the record cleaner. In addition, where the record player is placed at a position above the floor approximating to the level of the eyes of the user, attempt to turn the record cleaner on the disc record with his hands raised above the eye level is likely to result in wobbling motion of the record cleaner relative to the disc record while pivoting about the point of contact of the top of the turntable spindle to the shaft member unless the handle is carefully held with the hand to keep the shaft member in exact alignment with the longitudinal axis of the turntable spindle. This wobbling motion of the record cleaner relative to the disc record involves uneven application of pressure to the grooved surface of the disc record.

SUMMARY OF THE INVENTION

Accordingly, the present invention has been developed with a view to substantially eliminating the above disadvantages and inconveniences inherent in the prior art record cleaners and has for its essential object to provide a self-propelled record cleaner which, when placed on the disc record and then operated, runs by itself around the turntable spindle while cleaning or brushing the record surface without requiring for the user to do any manipulative effort to clean or brush the record surface.

One of important advantages offered by the present invention is that what is required for the user of the record cleaner according to the present invention to do is to manipulate, that is, turn on, an electric power switch after or before the record cleaner is mounted on the disc record resting on the turntable with the turntable spindle engaged through the center opening of the disc record. Since the casing of the record cleaner according to the present invention has a bearing hole adapted to receive the turntable spindle and a battery-operated motor drive unit coupled to a drive wheel, the record cleaner can run on the disc record revolving around the turntable spindle while cleaning or brushing the disc record. Because of this, no one is required to touch the record cleaner during the cleaning or brushing operation being performed. This obviates the possibility of uneven pressure being applied to the disc record during the cleaning or brushing operation thereby keeping the grooved surface of the disc record free from any possible formation of indents and also free from any possible uneven cleaning or brushing.

Preferably, the drive wheel necessary to make the record cleaner of the present invention self-propelled on the disc record around the turntable spindle is adapted to ride on either a central non-recorded or non-grooved area of the disc record or an outer peripheral margine of the disc record, while a cylindrical cleaning element such as a brush or a finely napped cloth turned around a core member is so positioned and so supported as to ride on a recorded or grooved area of the disc record.

Preferably, the record cleaner of the present invention comprises a generally rectangular cross-sectioned, elongated casing of a length larger than the radius of the phonographic disc record now available in the market, so that substantially all component parts of the record cleaner including one or more batteries can be accommodated within one end portion of the casing which, when the record cleaner is placed on the disc record to be cleaned or brushed, is held in position immediately above the central non-grooved or non-recorded area of the record. This arrangement is advantageous in that the weight of the record cleaner can be supported mainly by the non-grooved area of the disc record rather than by the delicate and important grooved area of the same disc record, thereby lessening or substantially eliminating the possible damage to the disc record.

Preferably, a cylindrical cleaning element which cleans or brush the record surface and a drive wheel necessary to cause the record cleaner to move on the record surface during the cleaning or brushing operation are axially aligned to avoid possible biases of weight components of the record cleaner which would hamper a smooth movement of the record cleaner in a direction generally laterally of the longitudinal extent of the cleaning element.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Before the description of the present invention proceeds, it is to be noted that the like parts are designated by like reference numerals throughout these drawings.

Referring to FIGS. 1 to 6, the self-propelled record cleaner according to the present invention comprises a two-component casing structure of generally elongated, rectangular-sectioned configuration composed of upper and lower casings 40 and 41. Each of these casings 40 and 41 generally has a pair of opposite end walls 40a and 40b, or 41a and 41b, a pair of opposite side walls 40c and 40d, or 41c and 41d, and top or bottom walls 40e or 41e, all being assembled or molded together into a generally rectangular container-like configuration. The two-component casing structure is generally divided into two longitudinally aligned compartments Ca and Cb by a partition wall P constituted by a pair of separate partition wall members 40f and 41f fast respectively with the upper and lower casings 40 and 41. For the purpose as will become clear from the subsequent description, the partition wall P has a support hole 43 which is, in practice, defined by a pair of semi-circular recesses defined in the respective partition wall members 40f and 41f. The casing structure also has a support wall S positioned within the compartment Ca and having a support hole 44 defined therein, said support wall S being constituted by a pair of separate support wall members 40g and 41g fast respectively with the upper and lower casings 40 and 41. As is the case with the support hole 43, the support hole 44 is defined by a pair of semi-circular recesses defined in the respective support wall members 40g and 41g, said semi-circular recess in the support wall member 41g being best shown in FIG. 2. It is to be noted that the support holes 43 and 44 are axially aligned with each other in parallel relation to the longitudinal extent of the casing structure while the partition wall P and the support wall S are spaced a distance required for the walls P and S to support the opposite ends of a cylindrical cleaning element 45 of a particular size in a manner as will be described later.

Figures 1, 2:
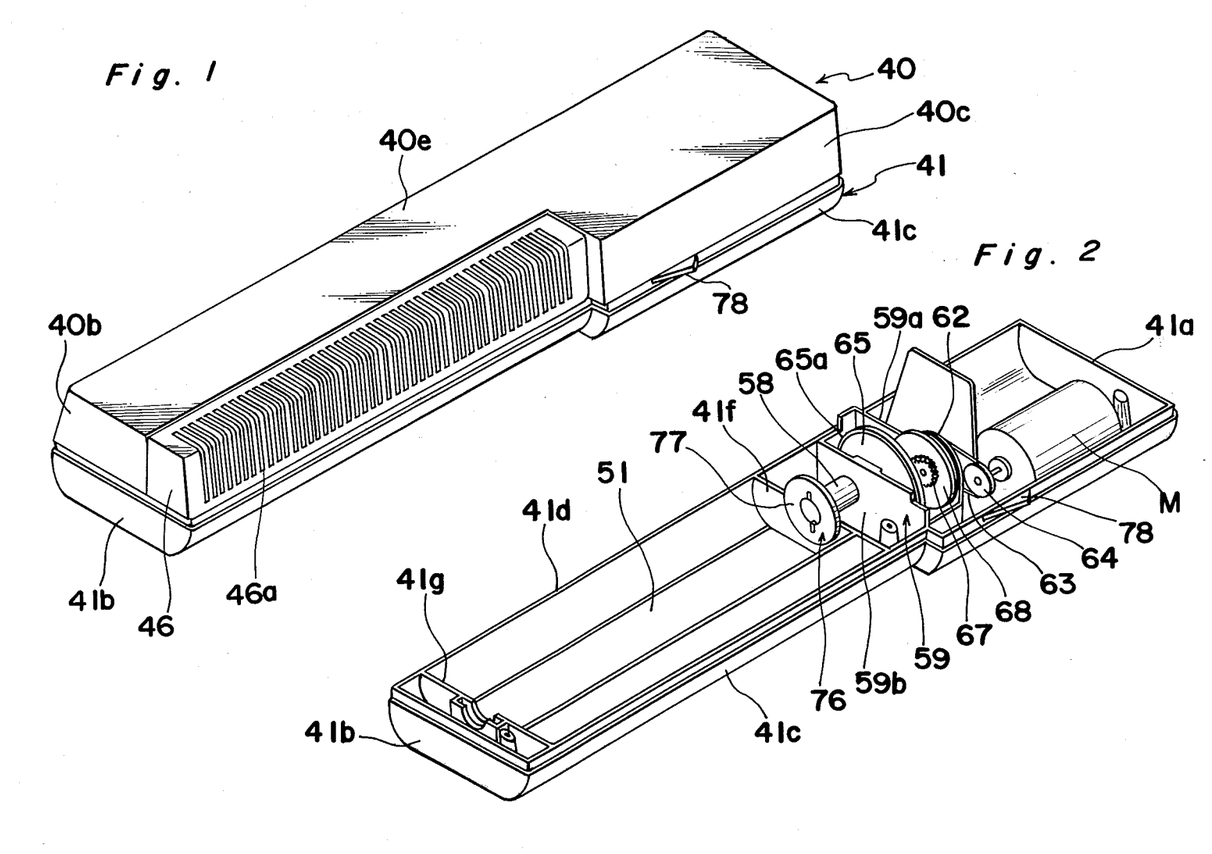
FIG. 1 is a perspective view of the record cleaner according to a preferred embodiment of the present invention.
FIG. 2 is a perspective view of the record cleaner shown in FIG. 1, with a top casing component removed away.
Figure 5:
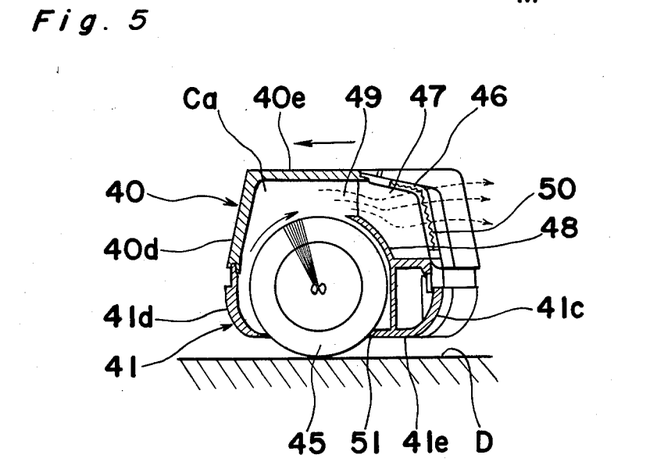
FIG. 5 is a transverse sectional view of the record cleaner shown in FIG. 1, showing the path of flow of air current induced by the rotation of a cylindrical cleaning brush.

As best shown in FIGS. 1 and 5, a portion of the side wall 40c of the upper casing 40 is formed into a removable perforated lid 46 having a plurality of apertures, for example, parallel slots 46a, defined therein. This perforated lid 46 is adapted to close the opening leading into a dust collecting chamber 47 which is, as best shown in FIG. 5, defined within the compartment Ca by respective portions of the walls P and S and a lateral partition wall 48, said lateral partition wall 48 protruding from the lower free edge of the side wall 40c towards the opposite side wall 40d and terminating at a position spaced a distance from the side wall 40d. As clearly shown in FIG. 5, a side edge portion of the lateral partition wall 48 opposite to the side wall 40c is upwardly curved so as to partially overhang the cylindrical cleaning element 45 and is spaced from the top wall 40e to define an air current passage 49. One surface of the perforated lid 46 facing the dust collecting chamber 47 is lined with a suitable filtering member 50 made of, for example, fine mesh filtering cloth.

Figure 6:
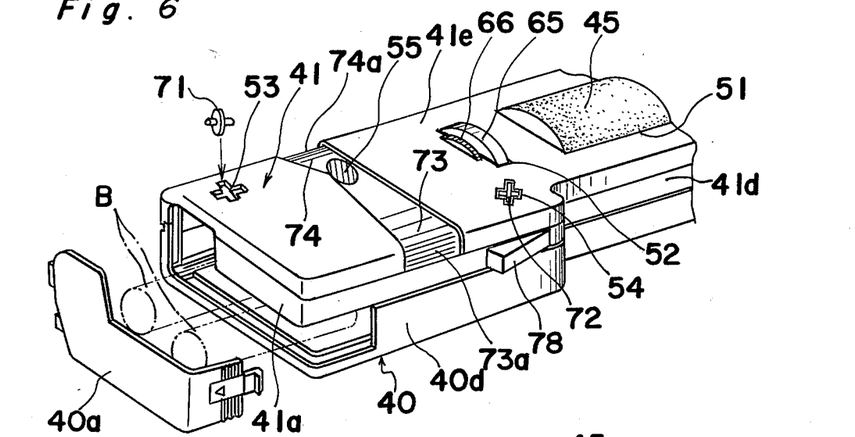
FIG. 6 is a perspective view of one end portion of the record cleaner shown in FIG. 1.

As best shown in FIG. 6, the end wall 40a of the upper casing 40 serves as a removable lid for closing the opening leading into a battery chamber, which battery chamber is defined together with a motor chamber in side-by-side relation to each other within the compartment Cb. It will, therefore, readily be seen that, by removing the end wall or lid 40a from the casing structure, batteries B can be loaded into and unloaded from the battery chamber.

As best shown in FIGS. 2 and 6, the bottom wall 41e of the lower casing 41 has defined therein a rectangular opening 51 extending between the wall members 41f and 41g, a slot 52 on one side of the partition wall member 41f opposite to the rectangular opening 51 and extending at right angles to the longitudinal extent of the rectangular opening 51, a pair of bearing apertures 53 and 54, and a bearing hole 55, the function of each of which will become clear from the subsequent description.

So far illustrated in FIGS. 3 to 6, the cylindrical cleaning element 45 comprises a core rod 45a composed of a pair of twisted wire members and having a helical brush 45b having a plurality of flexible, fine and soft bristles, said helical brush 45b being turned spirally around the core rod 45a from one end to the other with its bristles extending radially outwardly from the core rod 45a so as to represent a right cylindrical configuration.

The opposite ends of the core rod 45a which protrude outwardly from the helical brush 45b have respective cylindrical bearing bushings 56 and 57 rigidly and non-detachably mounted thereon, which bushings 56 and 57 may not be always be necessary if at least the opposite ends of the core rod 45a have a respective smooth peripheral surface. The cylindrical cleaning element 45 is rotatably supported by the partition wall P and the support wall S with the bushings 56 and 57 engaged in the respective support holes 43 and 44. More specifically, while the bushing 57 is rotatably received in the support hole 44 in the support wall S, the bushing 56 is supported in the support hole 43 in the partition wall P through a cylindrical coupler 58 rotatably received in and extending through the support hole 43, it being to be understood that the bushing 56 is detachably splined to the coupler 58 in coaxial relation to each other. The coupler 58 is in turn operatively connected through a transmission unit, as will be described later, to a battery-operated motor M, for example, a DC micromotor, which is stationarily held within the motor chamber and rigidly mounted on the bottom wall 41e of the lower casing 41.

Figure 3:
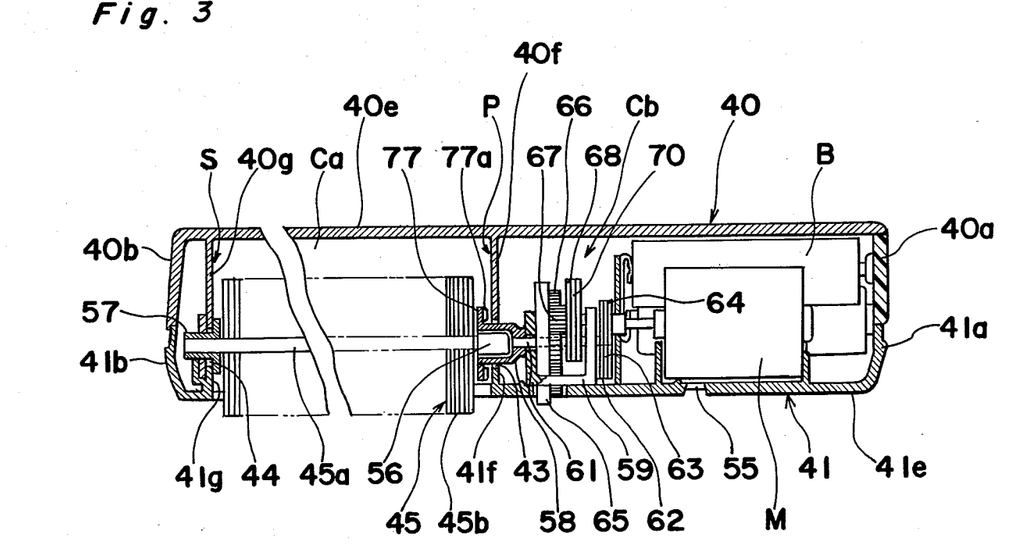
FIG. 3 is a side sectional view of the record cleaner shown in FIG. 1.
Figure 4:
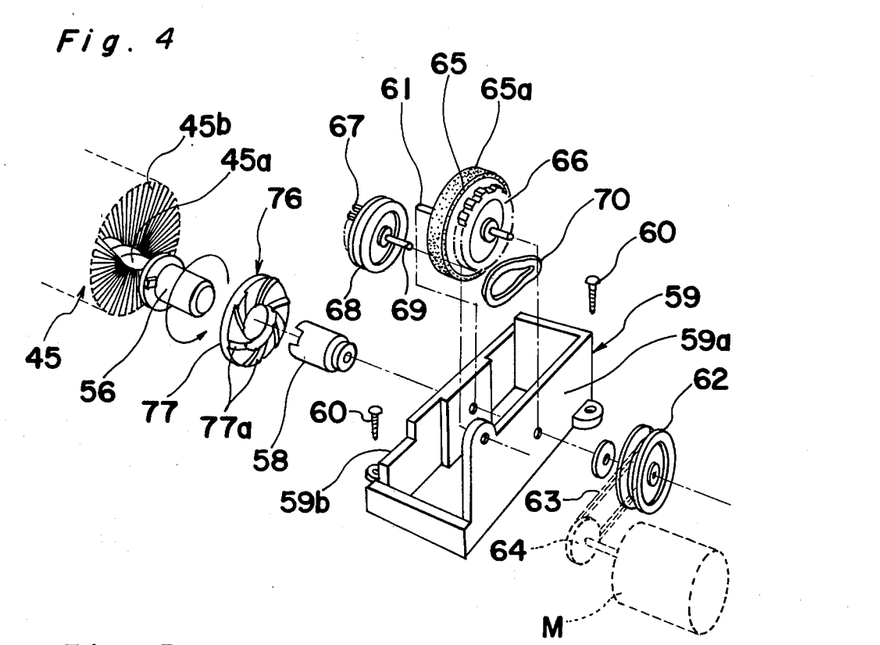
FIG. 4 is an exploded view showing the battery-operated motor drive unit employed in the record cleaner shown in FIG. 1.

As best shown in FIGS. 2 to 4, the transmission unit includes a carriage 59 generally constituted by a pair of spaced carrier plates 59a and 59b, which carriage 59 is rigidly mounted by means of set screws 60 on the bottom wall 41e of the lower casing 41 so as to render the carrier plates 59a and 59b to traverse the longitudinal extent of the casing structure. This carriage 59 has a shaft 61 rotatably extending through the carrier plates 59a and 59b with its opposite end portions positioned outside the carriage 59, the coupler 58 being rigidly mounted on, or otherwise pressure-fitted to, one end portion of the shaft 61 adjacent the carrier plate 59b.

Rigidly mounted on or pressure-fitted to the other end portion of the shaft 61 adjacent the carrier plate 59b is a driven pulley 62 which is operatively coupled through an endless belt 63, preferably made of either urethane rubber or silicone rubber, to a drive pulley 64 rigidly mounted on the drive shaft of the motor M. The pulleys 62 and 64 are preferably so sized relative to each other that, if the motor M can rotate at a rate of 5,000 rpm, the driven pulley 62 and, hence, the shaft 61 can rotate at a reduced rate of about 3,000 rpm.

In the construction so far described, it will readily be seen that rotation of the motor M results in rotation of the cylindrical cleaning element 45 in the same direction as that of the motor M.

In order to enable the record cleaner to be self-propelled, a drive wheel 65 preferably made of a hard synthetic resin, such as polyacetal, and having its outer peripheral face lined with a rubber lining 65a preferably made of urethane rubber is positioned within a space between the carrier plates 59a and 59b and mounted on the shaft 61 for rotation independently of the shaft 61. This drive wheel 65 carries a gear wheel 66 rigidly secured to, or otherwise formed integrally with, the drive wheel 65 in coaxial relation thereto for rotation together therewith, said gear wheel 66 being constantly meshed to a reduced diameter gear 67. The reduced diameter gear 67 is rigidly secured to, or formed integrally with, a transmission pulley 68 in coaxial relation thereto, which pulley 68 is in turn rotatably mounted on a shaft member 69 rigidly carried by the carrier plate 59b in a substantially cantilever fashion. The transmission pulley 68 is operatively coupled to the shaft 61 by means of an endless belt 70 drivingly turned around the shaft 61 and the pulley 68 so that rotation of the shaft 61 resulting from the rotation of the motor M can be transmitted to the transmission pulley 68 and then to the drive wheel 65 through the meshed engagement of the gears 67 and 66. By this arrangement, the rotation of the shaft 61 at a rate of 3,000 rpm as hereinabove described results in rotation of the drive wheel 65 at a further reduced rate of, for example, about 200 to 300 rpm.

The transmission unit of the construction described above is so designed that, while the cylindrical cleaning element 45 is rotated in the same direction as that of the motor M, but at a speed reduced from that of the motor M, the drive wheel 65 can be rotated in a direction counter to that of any one of the motor M and the cylindrical cleaning element 45 at a speed further reduced from the reduced speed of the cylindrical cleaning element 45.

The drive wheel 65 so mounted on the shaft 61 for rotation independently of the shaft 61 is partially exposed to the outside of the casing structure through the slot 52 defined in the bottom wall 41e of the lower casing 41, the amount of projection of a peripheral portion of the drive wheel 65 to the outside of the casing structure beyond the bottom wall 41e being so selected that, when the record cleaner according to the present invention is placed on a disc record to be cleaned or brushed, the bottom of the record cleaner can be spaced a distance of 1 to 2 mm. from the surface of the disc record.

As best shown in FIG. 6, follower wheels 71 and 72 are rotatably carried by the bottom wall 41e of the lower casing 41 and seated partially within the respective bearing apertures 53 and 54 with respective portions exposed to the outside of the casing structure in a manner similar to the drive wheel 65. The bearing apertures 53 and 54 are so positioned relative to the drive wheel 65 that, when the record cleaner is placed on the disc record to be cleaned or brushed, the drive wheel 65 and the follower wheels 71 and 72 can provide a three-point support system effective to support the entire weight of the record cleaner including those of the batteries B, when the record cleaner is placed on the disc record, with no possibility of jolting and bumpy motions of the record cleaner during the angular movement of the latter around a turntable spindle then relatively rotatably engaged in the bearing hole 55 in the bottom wall 41e of the lower casing 41. In addition, in order to facilitate a smooth angular movement of the record cleaner around the turntable spindle TS (FIG. 9), each of the follower wheels 71 and 72 is so arranged that the plane of rotation of the respective follower wheel 71 or 72 lies in a plane parallel to the plane tangential to the circular path along which the drive wheel 65 is driven during the rotation of the record cleaner around the turntable spindle TS. In other words, these follower wheels 71 and 72 as well as the drive wheel 65 are so positioned that the axis of rotation of each of them extends in a direction radially of the bearing hole 55. In this connection, not only for the purpose of facilitation of the smooth rotation of the record cleaner around the turntable spindle TS, but also for the purpose of minimizing the loss of a drive force of the motor M, it is preferred that the cylindrical cleaning element 45 and the drive wheel 65 are axially aligned with each other such as shown and are positioned in line with the bearing hole 55.

Furthermore, the drive wheel 65 and the follower wheels 71 and 72 are so positioned relative to the bearing hole 55 that, when the record cleaner is placed on the disc record D (FIG. 9), all of them ride on the non-recorded or non-grooved area Da (FIG. 9) of the disc record D thereby avoiding a possible contact of any one of them with the delicate information-recorded or grooved area of the disc record D which would result in damage to the disc record.

Figure 7:
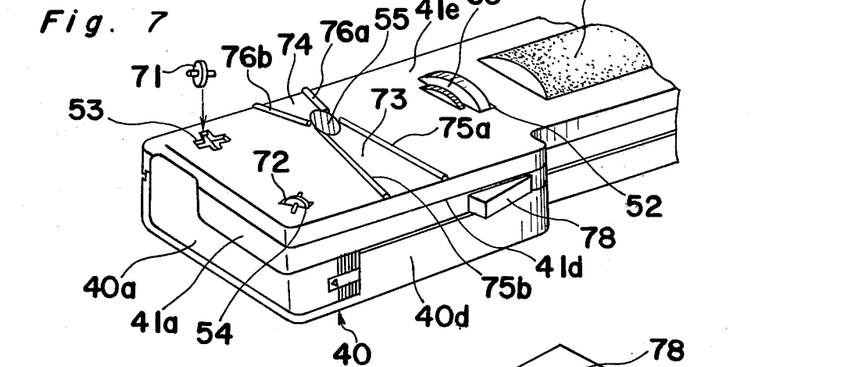
FIG. 7 is a view similar to FIG. 6, showing a modification applicable to the record cleaner shown in FIG. 5.

In any event, if this requirement is satisfied, the follower wheels 71 and 72 may be located on one side of the bearing hole 55 remote from the drive wheel 65 and adjacent the end wall 41a in a manner as shown in FIG. 7, though in FIG. 6 they are shown as located one adjacent the end wall 41a and the other adjacent the drive wheel 65.

Referring still to FIG. 6, the bottom wall 41e of the lower casing 41 has its exterior surface formed with a pair of grooved guideways 73 and 74 recessed inwardly of the thickness of the bottom wall 41e and extending radially outwardly from the bearing hole 55 in the opposite directions towards the side walls 41c and 41d, each of said grooved guideways 73 and 74 being so shaped as to converge towards the longitudinal axis of the bearing hole 55 such that, during the mounting of the record cleaner on the disc record D resting on the turntable T, the turntable spindle TS can be relatively guided into the bearing hole 55 along any one of the grooved guideways 73 and 74 without the user of the record cleaner being required to align the turntable spindle TS exactly with the bearing hole 55. It is to be noted that the number of the grooved guideways 73 and 74 may not be always two such as shown, but may be one or three. In addition, the grooved guideway or one of the grooved guideways may extend in a direction towards the end wall 41a of the lower casing 41 in parallel relation to the longitudinal extent of the casing structure.

Preferably, as best shown in FIG. 6, respective outer ends of the grooved guideways 73 and 74 remote from the bearing hole 55 are rounded at 73a and 74a to render the guideways 73 and 74 to be contiguous to the adjacent side walls 41c and 41d of the lower casing 41. By so doing, the user of the record cleaner can readily locate where the bearing hole 55 is in the casing structure, without being required to turn the record cleaner upside down to ascertain it.

It is to be noted that, instead of the employment of the grooved guideways 73 and 74 formed by recessing the bottom wall 41e inwardly of the thickness thereof such as shown in FIG. 6, they may be formed by rigidly securing, or otherwise bonding, two pairs of rib members 75a and 75b, 76a and 76b, one pair for each guideway 73 or 74, to the exterior surface of the bottom wall 41e of the lower casing 41 in a manner as shown in FIG. 7.

While the record cleaner of the construction so far described with reference to FIGS. 1 to 6 operates effectively and satisfactorily, there may be such a possibility that, since dusts on the disc record are brushed off from the record surface and are then transported towards the dust collecting chamber 47 by the action of the air current induced by the rotation of the cylindrical cleaning element 45, some of the dusts being transported towards the dust collecting chamber 47 may enter the compartment Cb through the support hole 43 in the partition wall P and, if not at all, may be piled up around a portion of the coupler 58 which extends rotatably through the support hole 43. This possibility may bring about not only contamination of the various component parts inside the compartment Cb, but also hindrance of a smooth movement of the various movable parts inside the compartment Cb. However, this possibility can advantageously be obviated by employing an impeller effective to generate a curtain of air counteracting to a portion of the dust carrying air current tending to flow into the compartment Cb through the support hole 43.

In the embodiment shown in FIGS. 1 to 6, the impeller is generally identified by 76 in FIGS. 2 to 4 and is, as best shown in FIG. 4, constituted by an annular wheel 77 rigidly mounted on the coupler 58 for rotation together therewith and positioned on one side of the partition wall P adjacent the cylindrical cleaning element 45. One of the opposite annular end faces of the wheel 77 facing the partition wall P is formed with a plurality of circumferentially equally spaced blade elements 77a, said blade elements 77a being so shaped and so arranged that, during the rotation of the annular wheel 77 together with the coupler 58 and, hence, the cylindrical cleaning element 45, air inside the compartment Cb can be drawn into the compartment Ca through an annular clearance between the coupler 58 and the support hole 43 to form a curtain of air flowing in a centrifugal direction within the compartment Ca along the partition wall P.

It is to be noted that the impeller 76 may be positioned within the compartment Cb adjacent the partition wall P. In this case, the blade elements 77a on the annular wheel 77 should be so shaped and so arranged as to draw the air inside the compartment Cb into the compartment Ca through the annular clearance between the coupler 58 and the support hole 43.

It is also to be noted that the impeller 76 may not be always of such a construction as hereinabove described and best shown in FIG. 4, but may be a fan wheel.

The effect achieved by the impeller 76 can be enhanced if the helical brush 45b of the cylindrical cleaning element 45 is turned spirally around the core rod 45a from one end adjacent the partition wall P towards the other end adjacent the support wall S in a direction counter to the direction of rotation of the cylindrical cleaning element 45 such that, during the rotation of the cylindrical cleaning element 45, dusts on the disc record can be swept to move laterally towards the outer periphery of the disc record.

Figure 8:
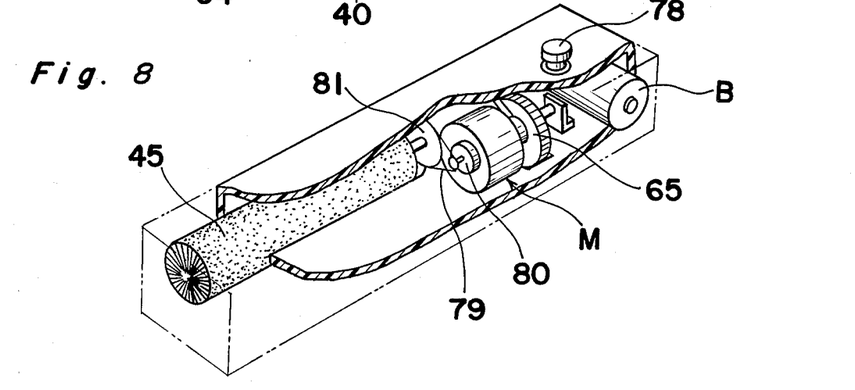
FIGS. 8 to 10 illustrate various forms of the battery-operated motor drive unit applicable to the record cleaner shown in FIG. 1.
Figure 10:
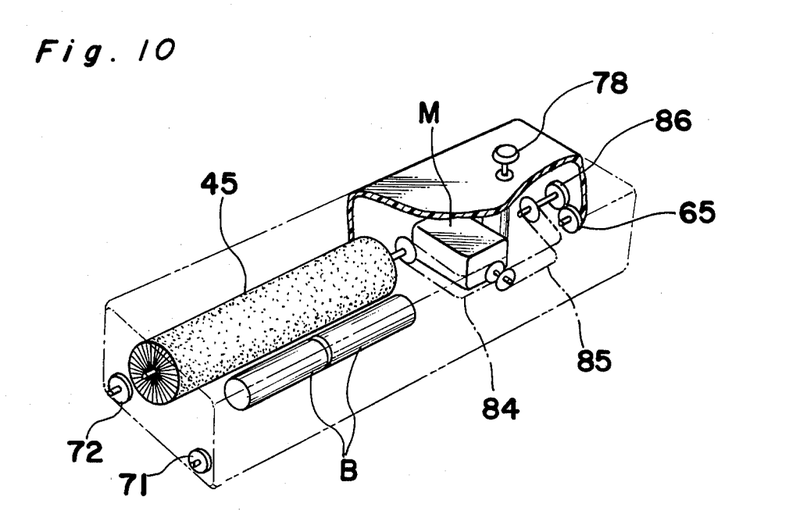

In FIGS. 1, 2 and 6, reference numeral 78 represents a manipulatable switch element for manipulating an electric power switch (not shown) electrically connected in series with the motor M through the series-connected batteries B. So far illustrated, this manipulatable switch element 78 is provided on one lateral side of the casing structure adjacent the bearing hole 55. However, in order to minimize the revolution of the manipulatable switch element 78 which occurs together with the rotation of the record cleaner around the turntable spindle TS during the cleaning or brushing operation, the manipulatable switch element 78 may be positioned on the top of the casing structure, that is, the top wall 40e of the upper casing 40, in alignment with the longitudinal axis of the bearing hole 55 such as shown in FIGS. 8 and 10. In this case, the manipulatable switch element 78 may be either a spring-biased push button or a push-on, pull-off button.

From the foregoing, it will readily be seen that, when the record cleaner of the construction shown in FIGS. 1 to 6 is placed on the disc record D with the turntable spindle TS rotatably engaged in the bearing hole 55, all of the wheels 65, 71 and 72 ride on the non-grooved area Da of the disc record D. For this purpose, the casing structure employed in the illustrated embodiment is of a type having a length larger than the maximum possible radius of the disc record D currently available in the commercial market, for example, the LP disc record, it being to be understood that the record cleaner according to the preferred embodiment can be made up to fit for use in TV and/or radio broadcasting stations and record manufacturing industries where disc records sometimes larger than the LP disc record are used.

Preferably, the direction of rotation of the drive wheel 65 is so selected as to enable the record cleaner to be self-propelled around the turntable spindle TS in a direction counter to the direction of rotation of the turntable T. This is because some of tiny foreign matters not so fine as to be easily borne in the air current can be swept to move laterally in a direction towards the outer periphery of the disc record being cleaned or brushed.

The record cleaner of the construction shown in FIGS. 1 to 6 can be modified in a number of ways which will now be described with reference to FIGS. 7 to 10.

Referring now to FIG. 8, the transmission unit is shown as comprising an endless belt 79 turned around drive and driven pulleys 80 and 81 which are rigidly mounted on one end of the core rod 45a of the cylindrical cleaning element 45 and one of the opposite drive shafts of the motor M, respectively, while the other of the opposite drive shafts of the motor M has the drive wheel 65 rigidly mounted thereon. Instead of the employment of the drive and driven pulleys 80 and 81 in combination of the endless belt 79, drive and driven gears in mesh with each other may be employed.

Figure 9:
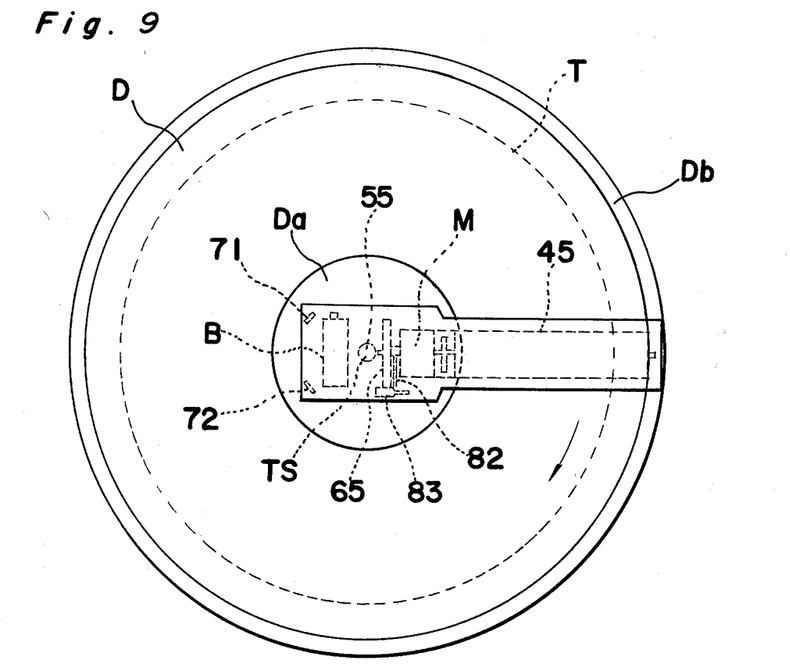

Referring to FIG. 9, the motor M is shown as having a pair of drive shafts connected to a common rotor of the motor M and extending in the opposite directions away from the body of the motor M, one drive shaft being directly coupled to the cylindrical cleaning element and the other drive shaft coupled through an endless belt 82 to a slip roller 83 which is rotatably supported on the bottom wall 41e of the lower casing 41 and which is frictionally engaged to the drive wheel 65. In this arrangement, the rotation of the drive shafts of the motor M is transmitted to the drive wheel 65 through the endless belt 82 and then through the slip roller 83 frictionally contacting the peripheral face of the drive wheel 65.

In FIG. 10, an example wherein the pair of the follower wheels 71 and 72 are positioned at one end of the casing structure adjacent the cylindrical cleaning element 45 and are adapted to ride on the outer peripheral margine Db (FIG. 9) of the disc record while the drive wheel 65 is positioned on one side of the bearing hole 55 opposite to and remote from the cylindrical cleaning element 45 is shown. In this modification shown in FIG. 10, the drive of the motor M is adapted to be transmitted to the cylindrical cleaning element 45 by means of an endless belt 85 in any known manner on one hand and also to the drive wheel 65 through an endless belt 85 and then through a slip roller 86 frictionally engaged to the drive wheel 65. In addition, the battery chamber accommodating the batteries B in line with each other is shown as formed inside the casing structure in parallel and side by side relation to the cylindrical cleaning element 45.

Although the present invention has fully been described in connection with the preferred embodiment thereof with reference to the accompanying drawings, it is to be noted that various changes and modifications other than those discussed hereinabove are apparent to those skilled in the art. By way of example, instead of the helical brush 45b, either a silicone-immersed cleaning cloth wound around a cylindrical cushioning layer of foam material may be employed or it may be of a type constituted by flexible, fine and soft bristles implanted on the rod member 45a in any known manner so as to extend radially outwardly therefrom. Moreover, the cylindrical cleaning element 45 may be so designed as to be replaceable with a fresh one.

Furthermore, the electric power switch for the motor M may be mounted on the casing structure in such a manner that when the turntable spindle TS is engaged into the bearing hole 55, the switch is automatically turned on in contact with the turntable spindle TS and, when the record cleaner is removed out from the disc record with the turntable spindle TS disengaged from the bearing hole 55, the same switch is automatically turned off.

Furthermore, although the drive wheel 65 has been described as made of a hard synthetic resin and having the rubber lining 65a, it may be made solely of rubber material if it has a sufficient hardness required to support the combined weight of the component parts of the record cleaner. In addition, where the rubber lining is employed, it may have an outer peripheral surface formed with fine indents effective to avoid any possible slip which would occur between the drive wheel and the record surface, although the employment of the fine indents on the outer peripheral surface of the rubber lining 65a is not always essential.

Accordingly, such changes and modifications are to be understood as included within the true scope of the present invention as defined in the appended claims unless they depart therefrom.

I claim:

1. A self-propelled record cleaner for cleaning a disc record having a center opening, a non-grooved area coaxial with the center opening, a grooved area coaxial with the center opening and positioned on one side of the non-grooved area opposite to the center opening and an outer peripheral margin, all being defined on at least one surface of the disc record, said disc record being mounted on a support having a spindle which, when the disc record is so mounted with said at least one surface thereof facing in a direction opposite to the support, projects through the center opening, said self-propelled record cleaner comprising, in combination:

a generally elongated casing having a dust collecting chamber defined therein said casing also having a bearing hole defined therein at a position adjacent to one end thereof for engagement with the spindle when the record cleaner is in use;

a generally cylindrical cleaning element supported in the casing so as to extend in a radial direction of the disc record when the record cleaner is mounted on the support with the disc record held between the support and the record cleaner;

means for defining a passage for guiding dusts being removed from the disc record by the cleaning element into the dust collecting chamber;

a drive wheel adapted to run on the disc record and rotatably carried by the casing;

means for driving said drive wheel and said cylindrical cleaning element in opposite directions with each other;

at least two roller elements operatively carried by the casing in spaced relation to each other and also to drive wheel to provide a three-point support system for the record cleaner in cooperation with the drive wheel;

all of said drive wheel, said driving means and said roller elements being supported in one end portion of the casing around the bearing hole.

2. A cleaner as claimed in claim 1, wherein said drive wheel is supported by the casing so as to roll over the non-grooved area of the disc record about the spindle when the record cleaner is in use.

3. A cleaner as claimed in claim 1 or 2, wherein the cylindrical cleaning element and the drive wheel are supported in the casing in axially aligned relation to each other.

4. A cleaner as claimed in claim 3, wherein the each of the roller elements comprises a follower wheel being rotatably supported by the casing with its axis of rotation aligned with the radial direction of the bearing hole.

5. A cleaner as claimed in claim 4, wherein said follower wheels are supported by the casing so as to roll over the non-grooved area of the disc record during the running of the record cleaner about the spindle.

* * * * *